(12) United States Patent
Parker

(10) Patent No.: US 8,205,804 B2
(45) Date of Patent: Jun. 26, 2012

(54) FLEXIBLE FLUID DELIVERY LINE WITH ADJUSTABLE END FITTING RETENTION BRACKET

(75) Inventor: Frank Parker, Reno, NV (US)

(73) Assignee: Frank Parker, Reno, NV (US)

( * ) Notice: Subject to any disclaimer, the term of this patent is extended or adjusted under 35 U.S.C. 154(b) by 259 days.

(21) Appl. No.: 11/966,865

(22) Filed: Dec. 28, 2007

(65) Prior Publication Data

US 2009/0165865 A1 Jul. 2, 2009

(51) Int. Cl.
*A01G 25/06* (2006.01)
*A01G 25/09* (2006.01)
*B05B 15/06* (2006.01)
*F16L 3/08* (2006.01)
*F16L 3/00* (2006.01)

(52) U.S. Cl. ............ 239/1; 239/200; 239/201; 239/588; 248/65; 248/74.3; 138/106; 138/DIG. 8

(58) Field of Classification Search .............. 239/1, 200, 239/201, 203, 587.1, 587.2, 587.5, 588; 248/65, 248/73, 74.1, 74.3, 74.4; 138/106, 110, 118, 138/DIG. 8
See application file for complete search history.

(56) References Cited

U.S. PATENT DOCUMENTS

| 124,897 | A | * | 3/1872 | Honsinger | 138/110 |
|---|---|---|---|---|---|
| 1,752,193 | A | | 3/1930 | O'Hanlon | |
| 2,147,124 | A | * | 2/1939 | Litle, Jr | 251/147 |
| 2,172,130 | A | | 9/1939 | Powell | |
| 2,185,741 | A | | 1/1940 | Sorg et al. | |
| 2,218,758 | A | | 10/1940 | Leal | |
| 2,218,759 | A | | 10/1940 | Lineman | |
| 2,769,999 | A | | 11/1956 | Sheahan | |
| 5,039,011 | A | * | 8/1991 | Parker | 239/1 |
| 5,040,729 | A | | 8/1991 | Carrozza | |
| 5,221,114 | A | | 6/1993 | Parker | |
| 5,311,753 | A | | 5/1994 | Kanao | |

(Continued)

FOREIGN PATENT DOCUMENTS

AU 648004 A 1/1993

OTHER PUBLICATIONS

Notification of Transmittal of the International Search Report and Written Opinion of the International Searching Authority dated Feb. 25, 2009 and International Search Report and Written Opinion in corresponding International Patent Application No. PCT/US2008/088180 filed Dec. 23, 2008, 10 pages.

*Primary Examiner* — Len Tran
*Assistant Examiner* — Ryan Reis
(74) *Attorney, Agent, or Firm* — Lewis and Roca LLP

(57) ABSTRACT

A flexible fluid delivery line with an end fitting retention bracket is disclosed for use during installation of an irrigation or sprinkler system. The retention bracket is malleable along its length and facilitates the positioning and orientation of a sprinkler head or other fluid delivery device with respect to the surrounding ground level. The retention bracket has two annular sleeves connected by a malleable elongate member. Through the pair of annular sleeves passes a semi-flexible riser. The annular sleeves are configured to substantially match the external circumference of the end fittings and retain the fitting therein. The retention bracket may be bent to suit various installation angles. The retention bracket prevents undesired turning or displacement of the end fittings during installation/use/removal of a sprinkler head.

3 Claims, 6 Drawing Sheets

U.S. PATENT DOCUMENTS

| | | | |
|---|---|---|---|
| 5,333,821 A * | 8/1994 | Lee ................................. | 248/52 |
| 5,350,201 A | 9/1994 | Bynum | |
| 5,524,327 A * | 6/1996 | Mickel et al. ................ | 24/115 A |
| 5,894,866 A * | 4/1999 | Horst et al. ................... | 138/172 |
| 6,354,937 B1 | 3/2002 | Crook | |
| 6,557,589 B2 | 5/2003 | Bozic et al. | |
| 6,755,361 B2 | 6/2004 | Danielson et al. | |
| 6,837,787 B2 | 1/2005 | Crook | |

* cited by examiner

FLEXIBLE FLUID DELIVERY LINE WITH ADJUSTABLE END FITTING RETENTION BRACKET

FIELD OF THE INVENTION

The present invention relates to irrigation or sprinkler systems such as those used to water lawns, gardens, orchards or the like. More specifically, the present invention relates to an adjustable end fitting retention bracket for use with a flexible fluid delivery line.

BACKGROUND OF THE INVENTION

Underground irrigation or sprinkler systems have long been used to deliver water necessary to sustain growing plants and foliage. It is common for homeowners to have such sprinkler systems installed to support various landscaping amenities such as lawns, trees, shrubs, gardens and the like. However, installation of such sprinkler systems is laborious and can require complex irrigation routing to adequately provide for water delivery and drainage.

A conventional system for landscape watering comprises sprinkler heads that are arranged in an array over the watering area wherein each head is connected to a network of underground pipes that supply water. As illustrated in FIG. 1, present practice is to use conventional plumbing hardware, such as: rigid or semi-rigid fluid conduits such as a supply line 100, angle fittings 102, Tees 104, rigid risers 106, unions (not shown) and the like in order to connect the sprinkler head 108 to the water supply lines. However, this construction is subject to numerous problems and inconveniences. For example, laying out and accurately cutting the supply line, risers and arranging Tees, angles, etc., is very tedious and expensive in terms of labor costs and hardware.

An example of the disadvantages of present practice is the high degree of skill and the high cost of labor that is required to properly dig trenches, not only for the supply line, but also for the branches of pipe (risers) leading from the supply line to each sprinkler head. In general, it is necessary to dig straight and wide trenches for the supply line. However, this becomes virtually impossible because of rocks, tree roots, foundations, buried cables or other objects. Where such obstacles are encountered, the trench must be dug, typically by hand, around and adequately away from such objects. Then supply line must be cut to fit, and elbows, angles, Tees, risers, unions and the like are then glued or threaded in place.

Great care must be taken when trenching in order to avoid striking underground obstacles such as main water service lines, electrical service lines, gas service lines, etc. Various building codes frequently require trenches to reach up to 16" to 24" or more in depth to avoid freezing the supply line and other fittings. Deep trenches require a greater amount of labor, time and equipment to excavate. Also, to prevent costly damage by or to trenching tools and equipment, trenches must be dug at a reasonably safe and appropriate distance away from obstacles such as sidewalks, curbs, driveways, planting borders, and the like. Conversely, since most sprinkler heads are located within a few inches from sidewalks, curbs, driveways, etc., the remaining trenching to these locations is almost always done by hand. Then a series of fluid conduits are installed to reach from the supply line to the sprinkler heads.

One significant problem is that during assembly of conventional sprinkler systems, the supply line (sometimes referred to as a lateral line) is constantly being moved around in the trench during installation of various Tees, risers and sprinkler heads that are being attached along its length. For example, as each section of pipe is cut-to-length to install various components, the supply line is lifted out of the trench. As a result of moving the supply line during assembly any measuring errors may combine and thus leave a particular length of pipe shorter than expected. The time to measure, calculate, cut, assemble, and fasten becomes extensive. This process repeats itself when the next sprinkler head is to be attached. Frequently, while handling the supply line for the next sprinkler head assembly, the sprinkler head (or heads) previously assembled and set into place, will unavoidably be disturbed.

The supply line typically undulates along even the straightest of trenches frequently resulting in misalignment of the sprinkler heads. The sprinkler head placement needs to be in a predetermined, relatively regular array to give proper watering coverage without overlap, waste or gaps in coverage. Thus, when installing the various fixed-length fluid conduits (i.e., risers, transitions and sprinkler heads), the resulting final sprinkler head array is usually misaligned to some degree, often significantly so.

Further, sprinkler head arrays must be laid out in 3-dimensions. That is, the land is rarely flat, yet sprinkler heads must all be positioned properly with respect to ground level, which varies throughout the watering area. Irregularities in the ground surface and elevation present a problem when installing an underground irrigation system. It is normally desirable to have the sprinkler heads flush with the ground surface. However, with differences in the surface elevation and angle from the supply lines to the sprinkler head usually require the risers to be customized to compensate for the irregularities. The irrigation systems offered today simply do not permit proper sprinkler head placement without very careful layout and skilled assembly of parts and typically do not facilitate proper final sprinkler head adjustment.

A common method of addressing the irregular ground problem is shown in FIG. 2, which uses a flexible fluid delivery line, which is commonly referred to as a semi-flexible riser 200 to couple the sprinkler head 108 to the supply line 100 by way of a Tee fitting 104. The semi-flexible riser 200 must be bent and supported with soil and is usually difficult to position and unstable relative to the ground surface. After ground preparation, each sprinkler head that is not correctly positioned (i.e., higher, lower, or angled) is usually removed and repositioned. If the sprinkler head is angled or significantly out of alignment, a shim or volume of soil is positioned along side of the riser or sprinkler head to adjust the orientation of the sprinkler head. This procedure is time consuming, inaccurate, unreliable, and allows for contaminants (e.g., dirt) to be introduced into the system.

Additionally, the semi-flexible riser 200 usually has a threaded fluid coupling/connector or end fitting 202 at each end, see FIG. 2, which provides a fluid connection between the Tee 104 and the sprinkler head 108. One disadvantage of the semi-flexible riser 200 is the installation and/or removal of the sprinkler head 108.

Firstly, during removal of the sprinkler head 108, a turning, twisting or torquing force is applied to the sprinkler head 108 to thereby disengage the threads between the end fitting 202 and the sprinkler head 108. The turning force may loosen the end fittings at either end of the semi-flexible riser 200, which has the inherent risk of disconnecting the riser at the supply line/Tee junction 204 instead of at the riser/head junction 206. In the event that the semi-flexible riser 200 disconnects from the supply line/Tee junction 204, the riser 200 will need to be excavated all the way back to the Tee 104 and reconnected. This type of repair is time consuming and causes damage to established landscaping.

Secondly, during installation of the sprinkler head 108, a turning force is applied to the sprinkler head 108 which engages the treads between of the end fitting 202 and fluidly couples the sprinkler head with the riser 200. However, to properly attach and adequately seal the junction 206, the sprinkler head 108 typically requires substantial tightening with respect to the threads of the end fitting 202. Since the end fitting 202 is free to turn or twist the semi-flexible riser 200, properly tightening the sprinkler head 108 to the riser 200 is problematic. As a result, if the sprinkler head 108 is not adequately secured to the riser 200, the junction 206 will leak and may cause the sprinkler head 108 to detach from the riser 200.

Thirdly, during either installation or removal of the sprinkler head 108, the end fitting 202 may freely turn or twist the semi-flexible riser 200 when the sprinkler head 108 is turned. As a result, the sprinkler head 108 may not adequately engage/disengage the end fitting 202. In this situation, a larger excavation hole must be dug around the riser 200 so that the installer may separately grasp the end fitting 202 and sprinkler head 108 for installation/removal operations. This is disadvantageous because of additional time consumption, requiring the use of both hands and the potential for damaging established landscaping.

Current semi-flexible riser installation techniques create two additional problems. First, if the sprinkler head is displaced in a downward direction a serious leak may occur. For example, if the sprinkler head is stepped on or run over by maintenance equipment this will cause a downward displacement of the sprinkler head. This downward displacement breaks the internal seal created between a bushing inserted into the inner tube and the end fitting. Second, since the end fitting and sprinkler head are permitted to freely turn after installation, the sprinkler head may become misaligned with respect to the landscaping. For example, after installation, the sprinkler head may be stepped on or bumped by maintenance equipment. A result of the misaligned sprinkler head is that water is wasted and the landscaping is not adequately irrigated.

Consequently, efforts to provide an efficient, cost effective and convenient connection between the supply line and the sprinkler head of an irrigation system have not met with much success to date.

SUMMARY OF THE INVENTION

The present invention facilitates the installation of a sprinkler head or fluid delivery device to a semi-flexible riser by providing a retention bracket that positionally constrains an end fitting to which a sprinkler head is typically attached.

In accordance with one aspect of the present invention, a semi-flexible riser is coupled with an end fitting retention bracket. The retention bracket comprises a malleable elongate member, the member having a first end, an opposing second end, a top surface, an opposing bottom surface. The member can be bent into a desired shape forming a curve between the first and second ends and will retain the desired shape when released.

The retention bracket further includes a first annular sleeve adjacent to the first end. The first annular sleeve extends away from the top surface and having a first inner surface. The retention bracket also has a second annular sleeve adjacent to the second end. The second annular sleeve extends away from the top surface in substantially the same direction as the first annular sleeve. The second annular sleeve has a second inner surface.

The semi-flexible riser passes through the first and second annular sleeves of the retention bracket. The semi-flexible riser has a first end, a second end and at least one end fitting coupled to either the first or second end of the semi-flexible riser. At least one of the inner surfaces of either the first or second annular sleeves is configured to engage a mating surface of the end fitting. The configuration of the semi-flexible riser and retention bracket prevents the end fitting from rotating with respect to the inner surface.

According to the present invention, there is provided a method of configuring a semi-flexible riser for use in an irrigation system. This includes the step of providing a retention bracket having a malleable elongate member, a first annular sleeve adjacent to a first end of the member, a second annular sleeve adjacent to a second end of the member. The first and second annular sleeves extend away from the member in substantially the same direction. The first annular sleeve configured to engage a mating portion of a first end fitting of the semi-flexible riser.

The method continues by providing a semi-flexible riser passing through the first and second annular sleeves of the retention bracket. The semi-flexible riser having a first end, a second end, a first end fitting connected to the first end, and a second end fitting connected to the second. Next, the method provides the steps of connecting the second end fitting to the irrigation system and positioning the first annular sleeve to engage the mating portion of the first end fitting. The method concludes with the steps of bending the elongate member of the retention bracket and attaching a fluid delivery device to the first end fitting. In one variation, the method may include the step of burying the semi-flexible riser such that the fluid delivery device is orientated with respect to a ground level.

In other exemplary embodiments, the retention bracket may be configured with various modifications. Firstly, the retention bracket may comprise a first annular sleeve that partially extends towards the opposite end of the bracket and conversely a second annular sleeve that partially extends towards the first sleeve. Secondly, the retention bracket may have at least one inner surface that is a polygonal shape configured to engage the mating surface of an end fitting. The polygonal shape may be a hexagon. Thirdly, the retention bracket may have a key formed on at least one inner surface where the key is configured to mate with a keyway formed in an end fitting of a semi-flexible riser. Fourthly, the retention bracket may have a cross-section of at least one annular sleeve that is substantially similar to a cross-section of an end fitting.

In other exemplary embodiments, the present invention provides a retention bracket where the first annular sleeve is rigidly attached to an end fitting of a semi-flexible riser. Additionally, the retention bracket may be lengths that are in proportion to the length of a semi-flexible riser.

For a more complete understanding of the nature and various advantages of the present invention, reference should be made to the ensuing detailed description and claims, taken in conjunction with the accompanying drawings.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 5 is an isometric view of the straight retention bracket of FIG. 4a;

FIG. 6b is a cross-section view of an end fitting and a retention bracket, taken along section line B-B of FIG. 6a.

DETAILED DESCRIPTION OF THE INVENTION

The present invention facilitates the installation of irrigation and sprinkler systems by providing retention and positional support for semi-flexible risers. In the following description, numerous specific details are set forth in order to provide a more thorough description of the present invention. It will be apparent, however, to one skilled in the art, that the present invention may be practiced without these specific details. Other embodiments of the invention will readily suggest themselves to such skilled persons having the benefit of this disclosure. In some instances, well-known features have not been described in detail so as not to obscure the invention.

Figure 1:
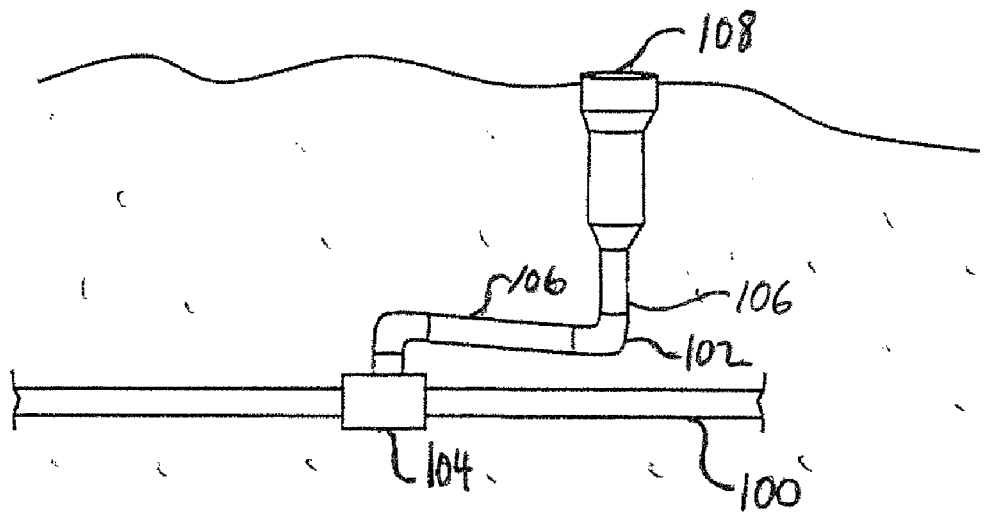
FIG. 1 is a side view of a typical irrigation system.
Figure 2:
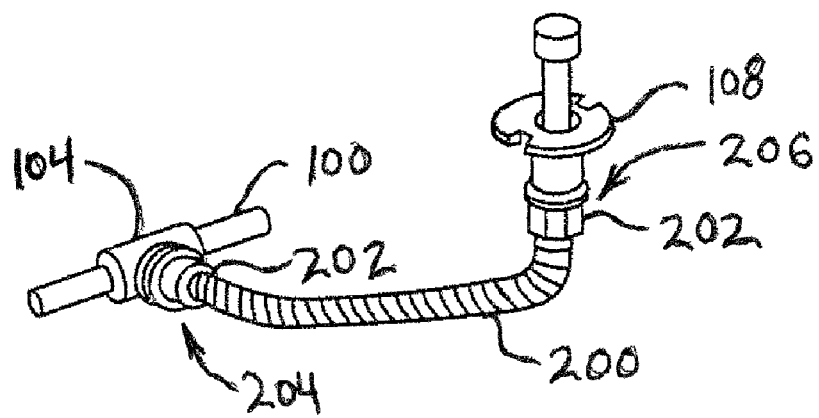
FIG. 2 is a side view an irrigation system implementing a semi-flexible riser.
Figure 3:
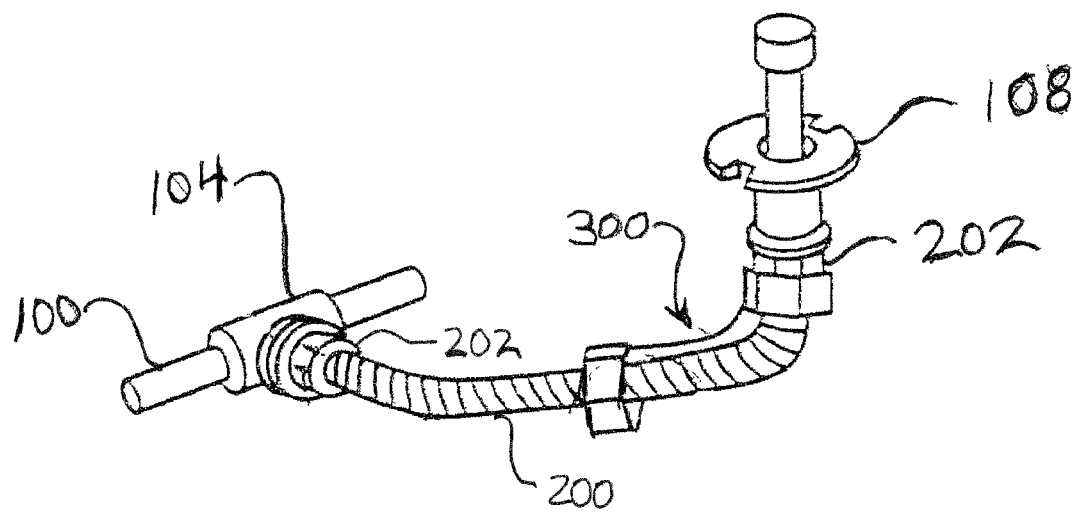
FIG. 3 is an isometric view of one embodiment of a semi-flexible riser and a retention bracket assembly in accordance with the present invention.

Directing attention to FIG. 3, which illustrates a semi-flexible riser 200 fluidly coupled to an irrigation supply line 100 at a Tee fitting 104. The riser 200 is combined with a retention bracket 300 that may be bent at a desired angle and positioned adjacent to the sprinkler head 108 to prevent undesired rotation or displacement of an end fitting 202 of the flexible riser 200. The retention bracket 300 further provides structural support for the flexible riser 200 and sprinkler head 108. By structurally supporting the flexible riser 200 and the sprinkler head 108 with the retention bracket 300, leaks are prevented from developing between the end fitting and the inner tube of the riser. The retention bracket 300 also facilitates proper orientation with the surrounding ground in which the sprinkler head 108 is installed. It is contemplated that the sprinkler head 108 may be any type of fluid delivery devices that may be coupled to the riser such as a bubbler, a pop-up sprinkler head, a drip system fitting, a pipe fitting, a fluid coupling nipple and the like.

Figure 4A:
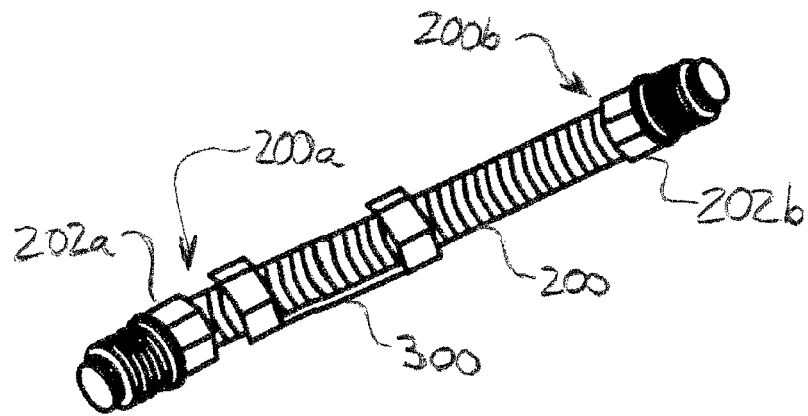
FIG. 4a is an isometric view of one embodiment of a straight semi-flexible riser and retention bracket assembly in accordance with the present invention.

In FIG. 4a an isometric view of one embodiment of a straight semi-flexible riser 200 and end fitting retention bracket 300 assembly is shown. The semi-flexible riser 200 is generally an underground branch assembly that facilitates water delivery from a main supply line 100 to a sprinkler head 108. The semi-flexible riser 200 generally comprises a flexible convoluted hose having an anti-kinking feature and a pair of special end fittings. The anti-kinking feature of the semi-flexible riser 200 generally comprises either an external corrugated sheath that surrounds an inner flexible tube or an internal reinforcing element such as a steel or plastic coil embedded within the inner flexible tube wall. Such flexible hoses are disclosed in, for example, U.S. Pat. No. 5,039,011 issued on Aug. 13, 1991 to Parker, which provides an in-depth teaching regarding the construction of an exemplary flexible hose (riser) and is incorporated by reference herein in its entirety.

The semi-flexible riser 200 has a first end 200a and a second end 200b to which is connected a first end fitting 202a and a second end fitting 202b, respectively. The semi-flexible riser 200 is fitted with an end fitting retention bracket 300. The retention bracket 300, in an initial un-bent state, is freely slidable along the length of the semi-flexible riser 200. The retention bracket 300 is discussed in greater detail below with reference to FIG. 5.

The first and second end fittings 202a and 202b are substantially similar in construction and attachment to the semi-flexible riser 200. As such, the following disclosure will be specifically directed towards the first end fitting 202a, but it would be readily understood by one of ordinary skill in the art that the principles and elements discussed are equally applicable to either the first or second end fittings 202a or 202b.

Figure 4B:
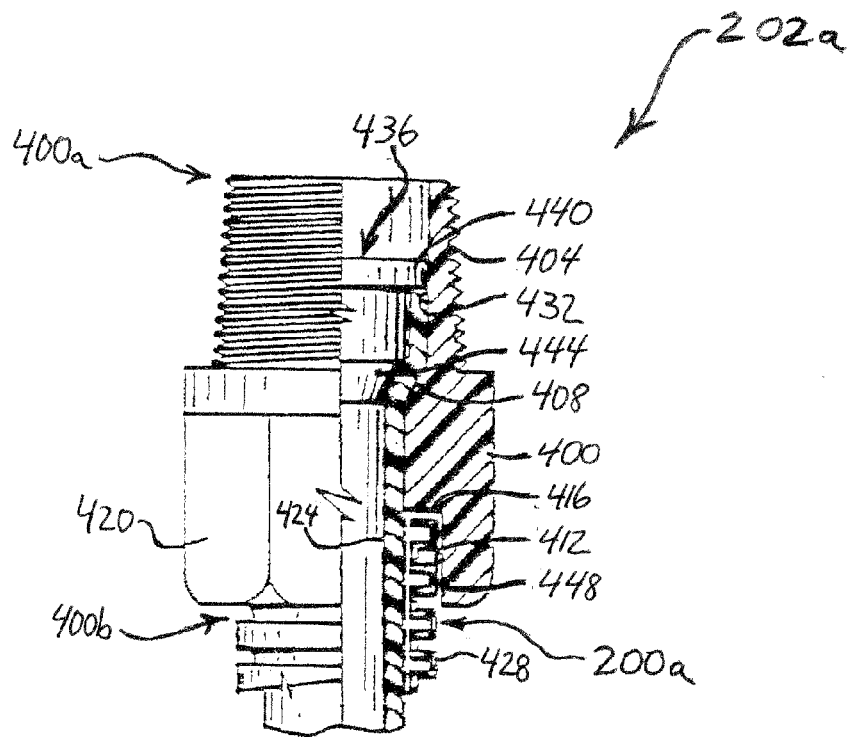
FIG. 4b is an enlarged side view of an exemplary end fitting coupled to a semi-flexible riser, the view being partially sectioned to reveal internal construction.

Turning to FIG. 4b which is an enlarged side view of an exemplary end fitting 202a coupled to a first end 200a of the semi-flexible riser 200 where the view is partially sectioned to reveal internal construction. The end fitting 202a generally comprises a hollow body 400 having a first end 400a and a second end 400b. In the exemplary embodiment shown, the hollow body 400 has an externally threaded upper end 404 formed on the first end 400a. The externally threaded upper end 404 is configured for threadable engagement with a mating portion of a fluid delivery device such as a sprinkler head 108. However, it is contemplated that other threaded couplings are possible and would readily be apparent to one of ordinary skill in the art. For example, the hollow body 400 may be configured with an internally threaded upper end 400a for operative engagement with an alternate fluid delivery device having a mating externally threaded end.

Approximately, midway between the first and second ends 400a and 400b of the hollow body 400, is an internally tapered shoulder 408. At the second end 400b of the hollow body 400 is a counterbore 412 having a shoulder 416 formed within the inner end of the counterbore 412. The exterior of body 400 may be formed with an external circumferential profile 420 that is hexagonal so that a wrench or other tool may be used to tighten the body 400 to another component such as a sprinkler head 108.

It is contemplated that the exterior of body 400 may also be formed with other variations in circumferential profile so that the body may be adequately tightened or loosened with respect to other components. For example, the circumferential profile may comprise other polygonal shapes like octagonal, triangular, oval or other geometric configurations that permit grasping or retention of the exterior of body 400. Additionally, it is further contemplated, that the body 400 may further comprise configurations such as a key and keyway where the body 400 has a keyway formed thereon and a key is formed on a separate member. This arrangement would then enable the key of the separate member to engage the keyway formed on the body, which in turn would facilitate grasping of the body during tightening and loosening operations. However, one of ordinary skill in the art, would appreciate that the key and keyways may be reversed with respect to the components upon which they are formed and still provide adequate grasping and retention means of the end fitting.

The semi-flexible riser 200 is inserted into the second end 400b of body 400. The semi-flexible riser 200 has an inner flexible tubing 424 interposed within an outer convoluted tubing 428. As stated above, an exemplary example of a semi-flexible riser 200 is described in U.S. Pat. No. 5,039, 011. Accordingly, in order to attach the combination of the semi-flexible riser 200 to an end fitting 202a or 202b, the end 432 of tubing 424 is inserted through the second end 400b of body 400 to a position adjacent but spaced downward from the first end 400a of body 400.

A ferrule 436 is inserted in the upper end 432 causing it to expand to a diameter greater than that of the taper 408. Ferrule 436 has a cylindrical body having a collar 440 at its upper end so that the upper end 432 of the tubing 424 may fit against the underside of collar 440. The end of ferrule 436 opposite collar 440 is tapered as indicated by reference numeral 444 in order to facilitate insertion of the ferrule 436 into the upper end 432 of the flexible tubing 424. When assembled, the ferrule 436 and tubing 424 are press-fit to the inner surface of body 400. Meanwhile, the end 448 of convoluted tubing 428 is inserted into the counterbore 412 of the second end 400b and the end 448 rests against the shoulder 416. However, if enough turning force is applied to the body 400 to overcome the retention provided by the press-fit connection between the tubing/ferrule assembly and the body 400, the body 400 may turn with respect to the semi-flexible riser 200. Such end fittings are disclosed in, for example, U.S. Pat. No. 5,221,114 issued on Jun. 22, 1993 to Parker, which provides an in-depth teaching regarding the construction of various exemplary embodiments for end fitting 202 and is incorporated by reference herein in its entirety.

Surrounding the tubing 424 is a slightly shorter length of convoluted tubing 428 such as that manufactured by Holm Industries of Aurora, Ohio. Such convoluted tubing has been conventionally used as a protection for wire harnesses, for other hoses and tubings, for air ducts, air drain tubes, swimming pool hoses and irrigation tubes, as well as for other purposes. It may be made of various materials including nylon 6, nylon copolymer, polyethylene, polypropylene and other thermoplastic materials. The function of convoluted tubing 428 is to protect and re-enforce the rather easily damaged flexible tubing 424 and also to prevent kinking or collapse of the flexible tubing 424 when bent. Thus the convoluted tubing 428, being less flexible than the tubing 424, protects against improper installation as well as subsequent damage. The end 448 of convoluted tubing 428 is inserted through the counterbore 412 and abuts the shoulder 416.

Figure 5:
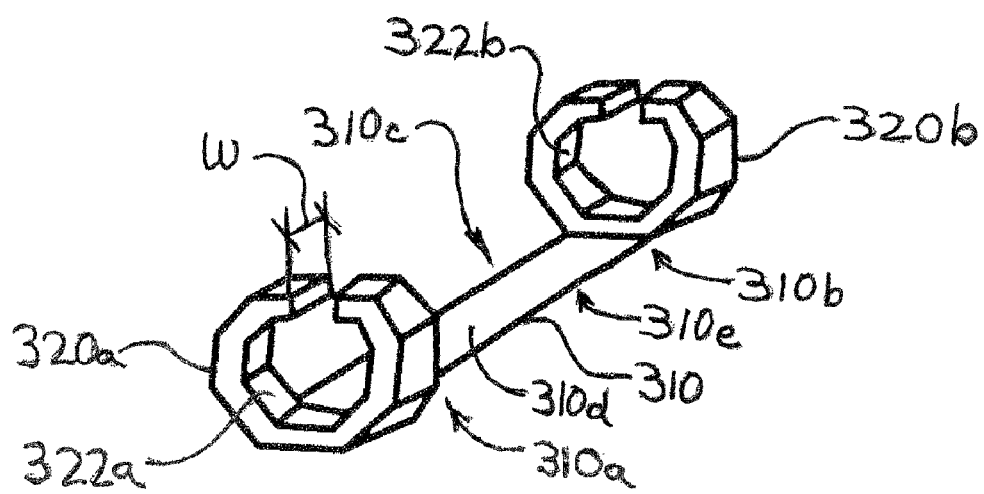

Reference is now made to FIG. 5, which shows an end fitting retention bracket 300 in isometric view. The retention bracket 300 comprises a malleable elongate member 310 having a first end 310a, a second end 310b, a center region 310c, a top surface 310d and a bottom surface 310e. The member 310 is a bendable member that may be deformed by hand to form any desired angle between the first and second ends 310a and 310b of the elongate member 310. The member 310 may be various lengths that correspond to an associated semi-flexible riser. In one embodiment, the member 310 is about three to five inches long. In another embodiment, the member 310 and is about ⅓ of the over all length of the riser. However, one of ordinary skill in the art will appreciate and understand that other lengths and proportions of the elongate member may be utilized to practice the invention.

Integrally formed adjacent to each first and second ends 310a and 310b of the member 310 is a first and second annular sleeve 320a and 320b extending away from the top surface 310d of the member 310. The annular sleeves 320a and 320b are generally encircling bands or cinctures that are configured and sized to fit over and around the convoluted tube 428 of the semi-flexible riser 200. The annular sleeves 320a and 320b have inner surfaces 322a and 322b which are further configured and sized to substantially match the external circumferential perimeter 420 of the body 400 of end fittings 202a and 202b. Additionally, the first annular sleeve 320a partially extends from the first end 310a towards the center region 310c of the elongate member 310. Similarly, the second annular sleeve 320b partially extends from the second end 310b towards the center region 310c of the elongate member 310. Thus, producing a pair of annular sleeves 320a and 320b that extend from their respective ends of the member 310, such that the sleeves have a width "W" adequate to engage the external circumferential perimeter 420 of their corresponding end fittings 202a and 202b.

It is contemplated that the end fitting retention bracket 300 be fabricated from a material that is malleable and suitable for placement underground (i.e., corrosion resistant). One such material is aluminum, however, one of ordinary skill in the art would readily appreciate that other materials (e.g., brass, copper, stainless steel, polymers, composites, etc.) are suitable for retention bracket fabrication. In another exemplary embodiment, the retention bracket may be fabricated from various plastics or polymers that provide adequate resiliency for the annular sleeves and still provide a malleable or bendable elongate member there between.

Another exemplary embodiment may use a combination of polymers and metallic/alloy materials in fabrication of the retention bracket. For example, the overall structure of the retention bracket may be fabricated using injection molding techniques to form the annular sleeves and a portion of the elongate member. The deformability of the elongate member may then be enhanced by the insertion, embedding or incorporation of a metallic/alloy (e.g., aluminum) strip or other malleable element within the member during molding operations. As a result, the majority of the retention bracket can be formed using injection molding techniques and the malleable member being formed by a combination of a metallic member encapsulated in the injection molded polymer. This embodiment is advantageous in that the complex perimeter structure of the annular sleeves can be formed using injection molding and the bendable member formed using both a polymer and a malleable material such as aluminum.

In another alternate embodiment, the retention bracket may comprise three individual elements and not be fabricated as a unitary construction. Thus, the elongate member can be formed entirely from a bendable material such as aluminum. The annular sleeves can then be formed entirely from a polymer using injection molding techniques. The retention bracket then being formed as an assembly of an annular sleeve coupled to each end of the elongate member. There are several techniques that may be implemented to couple/attach an annular sleeve to an end of the elongate member, such as mechanical fasteners (e.g., rivets, pins, screws, etc.), chemical bonding such as various adhesives, mechanical fitting such as a press-fit connection or combinations of these or other known techniques.

Figure 6A:
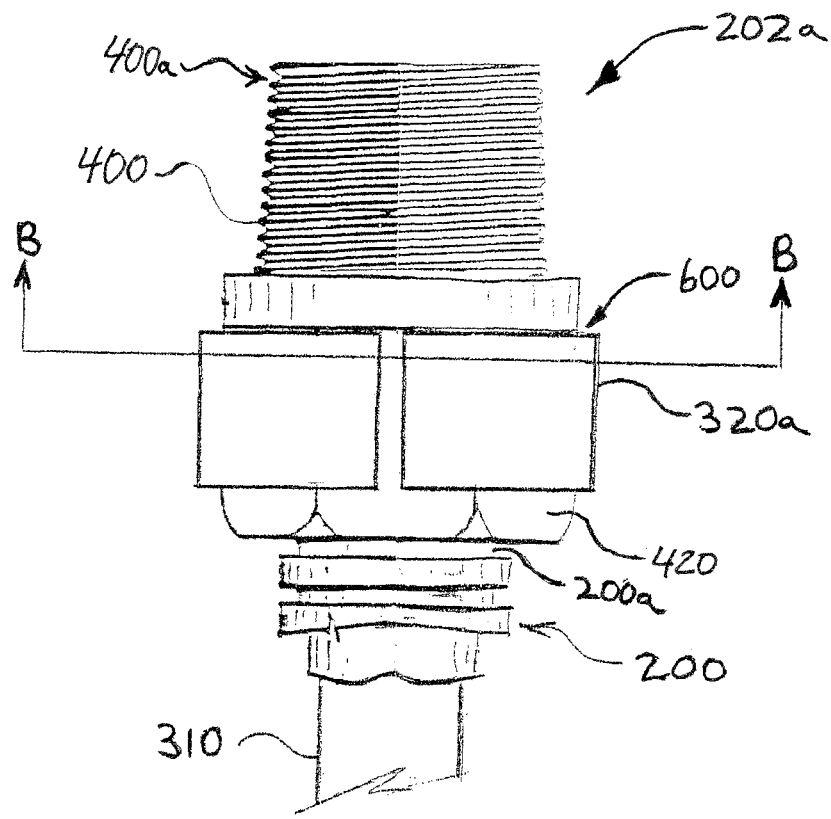
FIG. 6a is an enlarged side view of an end fitting with the retention bracket of the present invention operatively positioned therewith.
Figure 6B:
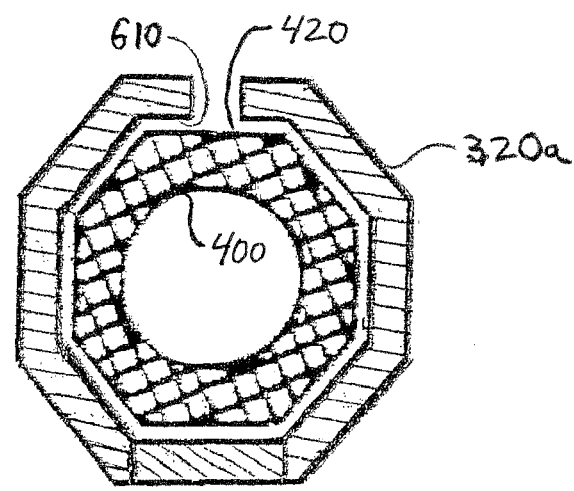

Directing attention to FIGS. 6a and 6b, which show an enlarged side view and a cross-sectional view of an end fitting coupled with a retention bracket operatively positioned therewith. Although the following disclosure will be specifically directed towards the first end fitting 202a, it would be readily understood by one of ordinary skill in the art that the principles and elements discussed are equally applicable to either the first or second end fittings 202a or 202b. As shown in FIG. 6a, an end fitting 202a is connected to a first end 200a of a flexible riser 200. The end fitting 202a has a body 400 having an external circumferential perimeter 420. The perimeter 420 is shown in FIGS. 6a and 6b as a hexagonal shape. However other shapes and circumferential configurations are possible as previously described above.

Positioned on the body 400 of end fitting 202a is an annular sleeve 320a. Extending downward from the annular sleeve 320a is a malleable elongate member 310 of a retention bracket 300. The annular sleeve 320a is positioned such that the end of the annular sleeve 320a engages an external collar as indicated by reference numeral 600. The external collar 600 is integrally formed around the exterior of the body 400. The external collar 600 prevents the annular sleeve 320a of the retention bracket 300 from sliding past a first end 400a of the end fitting 202a.

In a preferred embodiment, the inner surface 610 of the annular sleeve 320a is sized to substantially match the external circumferential perimeter 420 of the body 400 as shown in FIG. 6b. It is contemplated that the physical fit between the perimeter 420 and inner surface 610 are such that independent rotation of the body 400 of the end fitting 202a with respect to the annular sleeve 320a of the retention bracket 300 is prevented. As a result, the annular sleeve 320a retains the end fitting 202a thereby forming a cohesive assembly between the end fitting 202a and the retention bracket 300.

Figure 7:
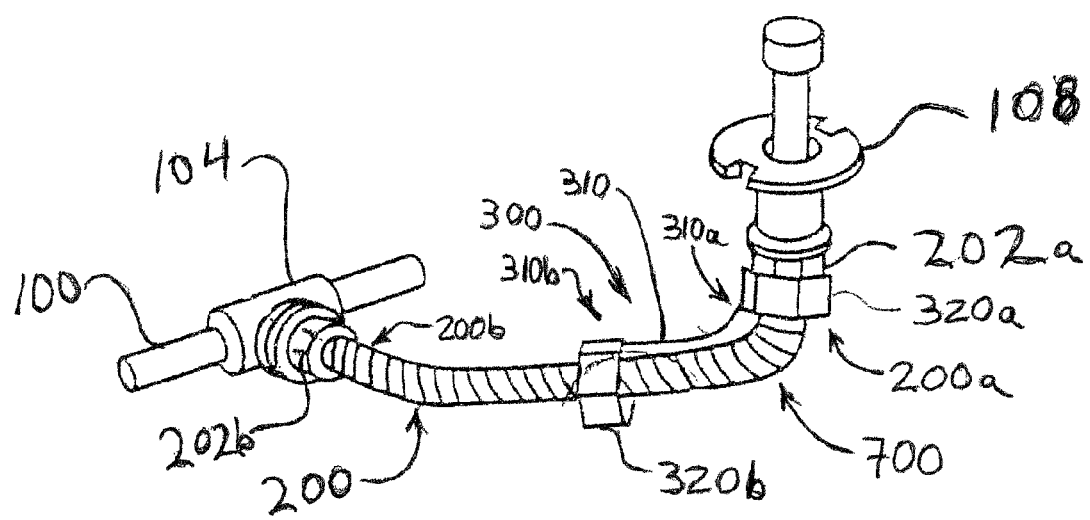
FIG. 7 is an isometric view of the semi-flexible riser, a retention bracket and a sprinkler head assembly in accordance with one embodiment of the present invention.

In use, a retention bracket 300 is combined with a semi-flexible riser 200. Illustrated in FIG. 7, the retention bracket 300 has two opposing annular sleeves 320a and 320b through which passes the semi-flexible riser 200. The retention bracket 300 is constrained with the semi-flexible riser 200 by two opposing end fittings 202a and 202b such that the retention bracket 300 is not permitted to slide off either end. End fitting 202b of riser end 200b is connected to a Tee 104 in an irrigation supply line 100. The connection between the end fitting 202b and the Tee 104 is preferably a mating set of threaded couplings, however, other types of couplings may be used such as press-fit or adhesively bonded fittings. It is also contemplated that the end fitting 202b may be a different size than end fitting 202a to operatively engage the Tee 104. Additionally, one of ordinary skill in the art will appreciate that other combinations of end fitting sizes may be employed to suit various fittings and fluid delivery device configurations.

The semi-flexible riser 200 is then positioned such that riser end 200a and end fitting 202a are located where a sprinkler head 108 is desired. The retention bracket 300 is slid down the length of the riser such that the annular sleeve 320a operatively engages the end fitting 202a. The positioning of the semi-flexible riser 200 generally requires that the riser form an upward bend 700 at end 200a, which leads to the sprinkler head 108. The upward bend 700 is formed by deforming the malleable elongate member 310 of the retention bracket 300 as desired to properly orientate the sprinkler head 108 with the surrounding ground level. Once the semi-flexible riser 200 is adequately positioned, a sprinkler head 108 is connected to the end fitting 202a.

By implementing the retention bracket 300 of the present invention, the sprinkler head 108 may be adequately tightened to the end fitting 202a. The bent retention bracket 300 prevents the end fitting 202a from turning because the bend 700 in the retention bracket 300 translates rotational forces at end 310a to lateral forces at end 310b. The surrounding ground into which the semi-flexible riser 200 is buried then resists these lateral forces.

The present invention provides several advantages not currently found in known irrigation or sprinkler system risers. Firstly, the end fitting retention bracket of the present invention provides rotational retention of the end fitting to thereby facilitate installation and/or removal of a sprinkler head or other fluid delivery device. Secondly, the retention bracket provides a malleable structure that facilitates positioning and orientation of the sprinkler head with respect to the surrounding ground level. Thirdly, the retention bracket prevents undesirable disconnection of the semi-flexible riser from the supply line during removal of a sprinkler head. Fourthly, the retention bracket provides structural support to the semi-flexible riser and end fitting to prevent downward displacement of the sprinkler head and thus prevents breaking the seal between the end fitting and the inner tube of the riser. Finally, the retention bracket of the present invention also reduces installation costs by avoiding the need to use multiple fittings to properly position a sprinkler head during sprinkler system configuration.

Although the above provides a full and complete disclosure of the preferred embodiments of the invention, various modifications, alternate constructions and equivalents will occur to those skilled in the art. For example, although the invention has been described with reference to a pair of similar annular sleeves, other configurations of the sleeves can be utilized such as one sleeve to correspond to an end fitting perimeter and another sleeve corresponding to the perimeter of the semi-flexible riser. Moreover, different types and sizes of end fittings can be used between the semi-flexible riser and the sprinkler head to practice the invention. Additionally, the retention bracket may be either removable or may be permanently attached to one end fitting of the semi-flexible riser. Therefore, the above should not be construed as limiting the invention, which is defined by the claims.

What is claimed is:

1. A method of configuring a semi-flexible riser for use in an irrigation system, comprising:
providing an irrigation sprinkler riser assembly comprising a retention bracket including a substantially flat strip formed from a single piece of a malleable material, a first end portion of the strip including a first set of opposed tabs extending outwardly in opposing directions at an angle of 90° from a direction along a length of the strip and preformed to define a first polygonal void, a second end portion of the strip including a second set of opposed tabs extending outwardly in opposing directions at an angle of 90° from a direction along a length of the strip and preformed to define a second polygonal void axially aligned with the first polygonal void, and an irrigation riser having first and second ends and disposed within and extending beyond the first and second polygonal voids of the retention bracket and including an outer flexible hose having a diameter smaller than the first and second polygonal voids so as to allow it to slide freely within the first and second polygonal voids, a flexible inner tube having first and second ends and disposed within the outer convoluted flexible hose, the inner tube including compression fittings at its first and second ends, a connector shell at each of the first and second ends of the inner tube, each connector shell having an inner surface mating with an outer surface of one of the compression fittings of the outer flexible hose and having a polygonal cross section mating with one of the first and second polygonal voids and sized to allow it to slide freely within the one of the first and second polygonal voids with which it mates, each connector shell further including a collar formed at a distal end of the polygonal cross section the collar acting as a stop member against inner edges of one of the first and second sets of opposed tabs;
coupling the connector shell at the first end of the flexible riser to the irrigation system;
sliding the retention bracket along the outer flexible hose until it is stopped against the stop member of the connector shell at the first end of the flexible riser with the first polygonal void and stop;

bending the elongate member of the retention bracket to orient the second end of the flexible riser at a desired angle; and coupling an irrigation fluid delivery device to the connector shell at the second end of the flexible riser.

2. The method of claim 1 wherein:

coupling the connector shell at the first end of the flexible riser to the irrigation system comprises engaging the threaded portion of the connector shell with mating threads on a fitting of the irrigation system; and coupling an irrigation fluid delivery device to the connector shell at the second end of the flexible riser comprises engaging the threaded portion of the connector shell with mating threads on the irrigation fluid delivery device.

3. The method of claim 1 further comprising the step of burying the semi-flexible riser such that the fluid delivery device is disposed at a desired orientation with respect to a ground level.

* * * * *